Aug. 2, 1949.   G. V. WOODLING   2,477,677
TURNABLE COUPLING MEMBER
Filed Nov. 22, 1947

INVENTOR.
George V. Woodling
BY

Patented Aug. 2, 1949

2,477,677

UNITED STATES PATENT OFFICE 2,477,677

TURNABLE COUPLING MEMBER

George V. Woodling, Cleveland, Ohio

Application November 22, 1947, Serial No. 787,569

5 Claims. (Cl. 285—97.1)

My invention relates in general to a tube coupling member, and more particularly to a tube coupling member adapted to be turnably and sealingly connected to a tube inserted therein. This invention constitutes a continuation-in-part of my copending applications for Letters Patent, Serial Numbers 574,467, now Patent 2,438,529, and 574,468, now Patent 2,438,530, filed January 25, 1945.

An object of my invention is the provision of making a turnable connection between a tube and a coupling member whereby the coupling member may be threadably connected to a threaded element without twisting the tube.

Another object of my invention is the provision of positioning the expanded section of the tube part within the connector body and part within the sleeve nut, taken in combination with providing sealing means in the sleeve nut which permits turnable engagement between the sleeve nut and the tube, whereby the nut may be threadably connected to the connector body without twisting the tube.

Other objects and a fuller understanding of my invention may be had by referring to the following description and claims, taken in conjunction with the accompanying drawing, in which:

Figure 1:
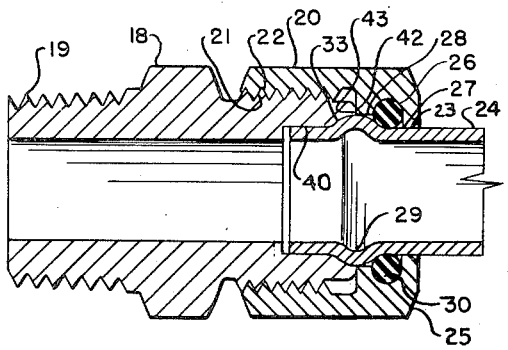
Figure 1 is a cross-sectional view of my invention embodying an "O" ring in the sleeve nut whereby the sleeve nut may be turned with reference to the tube for connecting the sleeve nut to the connector body, the "O" ring being subjected to the longitudinal pull of the tube.

With reference to Figure 1 of the drawing, my invention is preferably shown as being applied to a sleeve nut coupling member 20 which is adapted to be connected to a tube 24. The sleeve nut 20 is provided with female threads 22 and is adapted to be threadably connected to the male threads 21 of a connector body or fitting element 18. The sleeve nut is provided with an abutment surface or shoulder 42 which is arranged to abut against an abutment surface or seat 43 of the connector body 18, and makes a fluid pressure seal therebetween. The sleeve nut 20 comprises a nut portion whereby it may be turned by a suitable wrench or tool, and is provided with a counterbore 23 into which the end of the tube 24 is inserted. The tube may be of any suitable material, and is further characterized as being outwardly extensible, whereby a portion thereof may be expanded into the sleeve nut after insertion therein to make an internal expansion fit with the sleeve nut and the connector body 18.

The right-hand end of the sleeve nut is provided with an end surface 25, and the counterbore 23 extends longitudinally inwardly of the sleeve nut from the end surface 25. The counterbore 23 comprises an enlarged internal annular body in the form of a groove 26 to receive sealing means 30, which comprises an "O" ring constructed of resilient material of a rubber-like nature. The right-hand side of the groove 26 has a laterally extending wall which meets with the counterbore 23 to define an annular juncture 27, which closely surrounds the tube and entraps the "O" ring within the groove 26. Extending forwardly of the groove 26 is an enlarged internal annular wall 28, which receives the right-hand half of an expanded section 29 of the tube. The tube 24 extends into a counterbore 40 provided in the connector body 18. The annular wall 28 registers with an enlarged internal arcuate wall means 33 provided at the right-hand end of the connector body 18, which receives the left-hand half of the expanded section 29 of the tube. That is to say, the internal wall means 28 and the internal wall means 33 jointly constitute an enlarged internal wall means to receive the expanded section of the tube, whereby the tube may be turnably mounted within the sleeve nut. The sealing ring 30 in Figure 1 is engaged by the expanded section of the tube and is subjected to longitudinal pull of the tube, as well as providing means to seal the fluid pressure between the sleeve nut and the tube. When the tube is inserted into the sleeve nut, the "O" ring is slightly stretched so that it provides initial fluid sealing engagement with the tube, but permits relative turning of the sleeve nut and the tube, with the result that the entire combination provides a turnable expansion fit between the tube and the coupling members. The groove 26 extends outwardly for a distance greater than the annular wall 28 so as to receive an enlarged "O" ring, whereby substantially its lower portion only is engaged by the expanded section of the tube.

Figure 2:
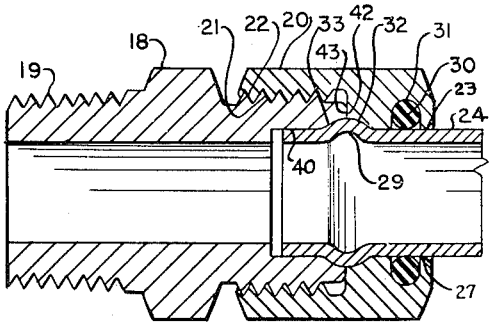
Figure 2 is a modified form of the invention in Figure 1, in that the "O" ring is not subjected to the longitudinal pull of the tube.

In Figure 2, I show a modified form of the invention, in that the sealing ring 30 is mounted in a separate groove 31 so that the "O" ring is not subjected to the longitudinal pull of the tube. In Figure 2, the sleeve nut is provided with an arcuate annular wall 32, and is adapted to be engageable by the right-hand half of the expanded section 29 of the tube to resist longitudinal pull of the tube from the sleeve nut. The annular arcuate surface 32 of the sleeve nut and the annular arcuate surface 33 of the connector body turnably receive the expanded section 29, which provides a turnable expansion fit therebetween so that the coupling members may be turned relative to the tube without twisting the tube, while at the same time, the sealing means 30 also permits relative turning of the coupling members with reference to the tube.

Figure 3:
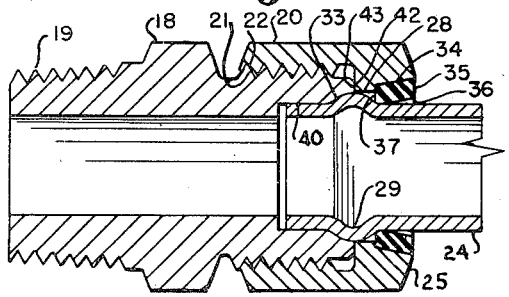
Figure 3 is a modified form of the invention in Figure 1, in that the "O" ring is replaced by a sealing sleeve which is fixedly bonded to the inside of the sleeve nut.

In Figure 3, I show a modified form of the invention in Figure 1, in that the "O" ring 30 is replaced by a sealing sleeve 35 which has its outer surface area fixedly bonded to a tapered bore 34 in the sleeve nut. The bonding of the sealing sleeve 35 to the tapered bore 34 is effected by well-known processes, such as the "Cycleweld" process developed by the Chrysler Corporation or the "Pliobond" process developed by the Goodyear Tire and Rubber Company, or by any other established process. The bonding produces a strong and vibration resistant welded connection, and the sealing sleeve 35 is thus able to resist longitudinal pull of the tube from the coupling of the sleeve nut. The sealing sleeve 35 when bonded to the tapered bore 34, provides a clearance 36 at the entrance mouth thereof so that the tube may be easily inserted therein prior to the expanding of the section 29. The left-hand end of the sealing sleeve at 37 engages the tube for making a seal with the tube. The sealing engagement at the right-hand end 37 in the tube extends for a longitudinal length less than the longitudinal length of the sealing sleeve, with the result that the sealing sleeve does not interfere or prevent the turning engagement between the sleeve nut and the tube. The sealing sleeve 35 in Figure 3 is subjected to the longitudinal pull of the tube, and thus is directly engageable by the expanded section of the tube. The operation of the coupling as shown in Figure 3 is substantially the same as that shown in Figure 1.

Figure 4:
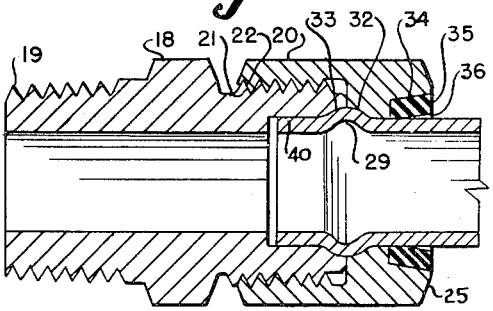
Figure 4 is a modified form of the invention in Figure 2, and shows a sealing sleeve fixedly bonded to the inside of the sleeve nut instead of embodying an "O" ring.

Figure 4 is a modified form of Figure 3, in that the sealing sleeve 35 is separated from the expanded section 29 of the tube and is not subjected to longitudinal pull of the tube. The operation of Figure 4 is substantially the same as that of Figure 2, except that the sealing sleeve which is bonded to the inside surface of the sleeve nut replaces the "O" ring 30 which is mounted in the groove 31.

Figure 5:
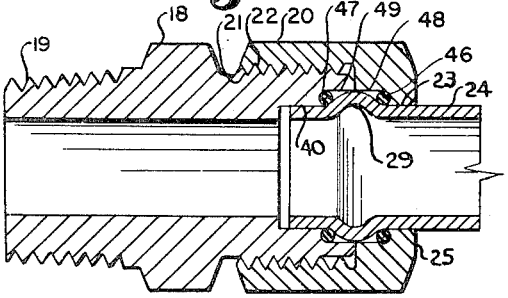
Figure 5 shows the employment of two rings, one being positioned in advance of the expanded section of the tube in the connector body, and the other being positioned in the sleeve nut on the rearward side of the expanded section of the tube.

Figure 5 shows the employment of two "O" rings 46 and 47, the "O" ring 46 being disposed in rear of the expanded section 29 of the tube, and the "O" ring 47 being disposed in advance of the expanded section of the tube. In Figure 5, the right-hand half of the expanded section 29 is adapted to be received by an annular internal wall means 48 in the sleeve nut, and the left-hand half of the expanded section 29 is adapted to be received by annular internal wall means 49 in the connector body 18. The two annular internal wall means 48 and 49 turnably receive the expanded section 32, whereby the coupling members may be turned relative to the tube without twisting the tube. The size of the "O" rings 46 and 47 in Figure 5 are smaller than those shown in Figures 1 and 2, and have a diameter which is substantially the same as the amount that the annular walls 48 and 49 are laterally spaced from the straight outer diameter of the tube.

The internal portion of the coupling member which receives the expanded section of the tube and the sealing means may be referred to as enlarged internal wall means.

Although my invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A sleeve element and a fitting element having threaded portions and abutment surfaces therebetween, said elements having at said abutment surfaces enlarged internal wall means to receive an expanded section of a tube inserted therein, said internal wall means in at least one of said elements receiving sealing means.

2. A sleeve element and a fitting element having threaded portions and abutment surfaces therebetween, said elements having at said abutment surfaces enlarged internal wall means to receive an expanded section of a tube inserted therein, said internal wall means in said sleeve element having a laterally extending wall which is opposed to said expanded section of the tube and which resists longitudinal pull of the tube from said elements, and sealing means in one of said elements.

3. A sleeve element and a fitting element having threaded portions and abutment surfaces therebetween, said elements having at said abutment surfaces enlarged internal wall means to receive an expanded section of a tube inserted therein, said internal wall means in said sleeve element having a laterally extending wall which is opposed to said expanded section of the tube and which resists longitudinal pull of the tube from said elements, and sealing means disposed between the expanded section of the tube and said laterally extending wall.

4. A sleeve element and a fitting element having threaded portions and abutment surfaces therebetween, said elements having at said abutment surfaces enlarged internal wall means to receive an expanded section of a tube inserted therein, one of said elements having sealing means therein and engagingly surrouding the tube.

5. A sleeve element and a fitting element having threaded portions and abutment surfaces therebetween, said elements having at said abutment surfaces enlarged internal wall means to receive an expanded section of a tube inserted therein, one of said elements having sealing means fixedly bonded therein and engagingly surrounding the tube.

GEORGE V. WOODLING.

No references cited.